(12) United States Patent
Guehring et al.

(10) Patent No.: US 10,146,422 B2
(45) Date of Patent: Dec. 4, 2018

(54) COMPUTER NETWORK AND METHOD FOR DISPLACEMENT OF AN OBJECT WITHIN A COMPUTER NETWORK

(71) Applicant: Siemens Aktiengesellschaft, Munich (DE)

(72) Inventors: Jens Guehring, Erlangen (DE); Stephan Nufer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 474 days.

(21) Appl. No.: 14/730,447

(22) Filed: Jun. 4, 2015

(65) Prior Publication Data

US 2015/0355808 A1  Dec. 10, 2015

(30) Foreign Application Priority Data

Jun. 4, 2014 (DE) .................. 10 2014 210 602

(51) Int. Cl.
*G06F 3/0486* (2013.01)
*G06F 3/0484* (2013.01)

(52) U.S. Cl.
CPC ........ *G06F 3/0486* (2013.01); *G06F 3/04842* (2013.01); *G06F 3/04847* (2013.01)

(58) Field of Classification Search
CPC ............ G06F 3/048; G06F 3/01; G06F 17/00; G09G 5/08
See application file for complete search history.

(56) References Cited

U.S. PATENT DOCUMENTS

| | | | | |
|---|---|---|---|---|
| 5,657,049 A | * | 8/1997 | Ludolph | ............... G06F 3/0481 345/419 |
| 5,801,700 A | | 9/1998 | Ferguson | |
| 6,331,840 B1 | * | 12/2001 | Nielson | ................ G06F 3/0488 345/1.1 |
| 2006/0218501 A1 | | 9/2006 | Wilson et al. | |
| 2009/0183088 A1 | * | 7/2009 | Saka | ....................... H04L 29/06 715/751 |
| 2011/0145693 A1 | * | 6/2011 | Mutic | ................... G06F 19/321 715/233 |
| 2011/0265119 A1 | | 10/2011 | Jeong et al. | |
| 2012/0226983 A1 | * | 9/2012 | Goldenberg | .......... G06F 3/0481 715/724 |
| 2012/0324368 A1 | * | 12/2012 | Putz | ...................... G06F 3/0486 715/748 |
| 2015/0141823 A1 | * | 5/2015 | Lee | ........................ A61B 8/469 600/440 |

* cited by examiner

*Primary Examiner* — Sang H Kim
(74) *Attorney, Agent, or Firm* — Schiff Hardin LLP

(57) ABSTRACT

In a computer network and a method for displacement of an object within a computer network, the computer network has a first computer system with a first graphical user interface and a second computer system with a second graphical user interface. A selection view of the second graphical user interface can be presented on the first graphical user interface, and a target location can be selected in the selection view. An object on the first graphical user interface can be displaced onto the target location.

8 Claims, 3 Drawing Sheets

COMPUTER NETWORK AND METHOD FOR DISPLACEMENT OF AN OBJECT WITHIN A COMPUTER NETWORK

BACKGROUND OF THE INVENTION

Field of the Invention

The present invention concerns the use of graphical user interfaces in the context of a medical apparatus. In particular, the invention relates to a computer network and a method for displacement of an object within a computer network.

Description of the Prior Art

Graphical user interfaces are being used increasingly as part of medical technology in order to control medical apparatus, and in particular imaging diagnostic apparatus. Computer systems with graphical user interfaces or a user interface (UI) are frequently networked together such that two or more separate computer systems can be controlled by a common keyboard and a common mouse.

In this regard, it is often very difficult technically to implement drag and drop operations in order to move data, such as sets of medical images, from one UI to another UI. A mouse or similar control element with a cursor is often used for moving objects. It is necessary for the cursor to leave the boundaries of the graphical user interface of the one computer system and reappear at the corresponding point in another computer system with a further graphical user interface, i.e. be displaced, and in the process it is still known what data reference is to be displaced with the cursor. This happens, for example, with a drag and drop operation.

Furthermore, a drag and drop operation of this type is not advantageous in terms of the distances traveled by the cursor, since long distances have to be traveled on a mouse pad, for example. This is time-consuming and does not provide a clear overview.

Another known option is to install multiple networked computer systems, via remote desktop links or virtualizations respectively, on a common computer system. This permits an improved "hand-over" of a mouse cursor location from one graphical user interface to another graphical user interface. However, remote systems of this type are costly in terms of their installation and maintenance.

SUMMARY OF THE INVENTION

An object of the invention is therefore to enable a simple hand over of an object from a first computer system to a second computer system.

This object is achieved by a computer network in accordance with the invention. Features, advantages and alternative embodiment variants mentioned in this regard are likewise also applicable to the other aspects of the invention. In other words, the network system, method and storage medium can be developed further with the features that are described or in connection with each other. In this regard, the functional features of the method are realized by corresponding modules, in particular hardware modules.

The above object is achieved in accordance with the invention by a computer network that has a first computer system with a first graphical user interface and a second computer system with a second graphical user interface, wherein a selection view of the second graphical user interface can be presented on the first graphical user interface and a target location can be selected in the selection view. An object on the first graphical user interface can be displaced onto the target location.

This means that an object can be selected on the first graphical user interface, which object is to be used on the second graphical user interface. For example, the first computer system consists of a medical apparatus such as a magnetic resonance apparatus that captures image data and presents it on the first graphical user interface. The second computer system, which has an active link to the first computer system, for example via a common interface or a common network, can be an analytical apparatus for example, which can perform further processing of the image data. Another possibility is for the two computer systems to form a larger unit that is installed in various places. Advantageously, the two computer systems access a common database in order to exchange data with each other. Furthermore, provision can be made for one or multiple objects to be displaced not only from the first computer system to the second computer system, but also vice versa from the second computer system onto the first computer system. Accordingly, a bi-directional exchange or transfer of objects is possible. In this connection, the "displacement" of one or a plurality of objects can also mean the copying of these objects so that the objects are simultaneously available on both computer systems or on a plurality of computer systems. In this regard, provision can also be made for it to be possible to displace a plurality of objects at the same time or in a controlled manner according to a configurable time sequence (e.g. clocked) via a single selection view.

The term "computer network" is understood to mean any interconnection, hard-wired and/or using wireless means, which links at least two computer systems. This includes, for example systems that are linked together via a bus system or the Internet.

"Object" is understood to mean elements or data that are presented on the graphical user interface in order to be used further at another point on a further user interface.

The selection view in accordance with the invention forms a dialog facility for a user and can be presented in the form of a list. Advantageously, the selection view is a miniature view so that the second user interface is also visible on the first graphical user interface in a miniature view, i.e. reduced in size. In this regard, detailed views can be represented in a simplified manner, in the form of fields or icons for example, in order to present a clarified selection facility.

In one form of embodiment of the computer network according to the invention, the first computer system forms part of a medical apparatus and the selected object is a captured image or a sequence of images. In this regard, any medical apparatus that are based on imaging methods can be used, such as magnetic resonance imaging apparatus, computed tomography apparatuses, ultrasound apparatus, and positron emission tomography apparatuses, for example.

The two computer systems can have a common control element, e.g. a mouse and/or keyboard. Furthermore, voice activation can also be understood to be a control element.

In a preferred exemplary embodiment, the first graphical user interface has at least one interactive region in which the object can be selected. In this interactive region, for example, a mouse cursor can have a functionality in that, by operation of the control device, in this case a mouse, it makes the selection view or the user dialog available.

In an embodiment of the invention, the interactive region has a region boundary at which the selection view or the miniature view respectively can be activated. This means that the selection view only becomes visible on the graphical user interface upon reaching the region boundary.

In a further embodiment, the interactive region can be activated by a dragging movement of a display element, e.g. a cursor. The dragging movement can form part of a drag and drop movement.

The above object also is achieved in accordance with the invention by a method for displacement of an object from a graphical user interface of a first computer system onto a graphical user interface of a second computer system. The method includes selection of the object on the first graphical user interface and presentation of a selection view of the second graphical user interface on the first user interface. Furthermore, the method includes selection of a target location in the selection view in order to displace the selected object from the first graphical user interface to the target location on the second graphical user interface.

In an exemplary embodiment, the method furthermore includes a presentation of the selection view at a region boundary of an interactive region of the selected object.

In another embodiment, a displacement of the object with a drag and drop movement is provided.

The method according to the invention can be implemented by a non-transitory, computer-readable encoded with programming instructions that cause the method according to the invention to be executed on the computer or a processor of the medical apparatus.

It is not necessary for all steps of the method to be executed on one and the same computer entity. The steps can also be executed on different computer entities. The order of the method steps can also be varied if appropriate.

Moreover, individual parts of the method described above can be executed in one commercial unit (e.g. first computer system) and the remaining components in another salable unit (e.g. second computer system), as a distributed system.

DESCRIPTION OF THE PREFERRED EMBODIMENTS

Figure 1:
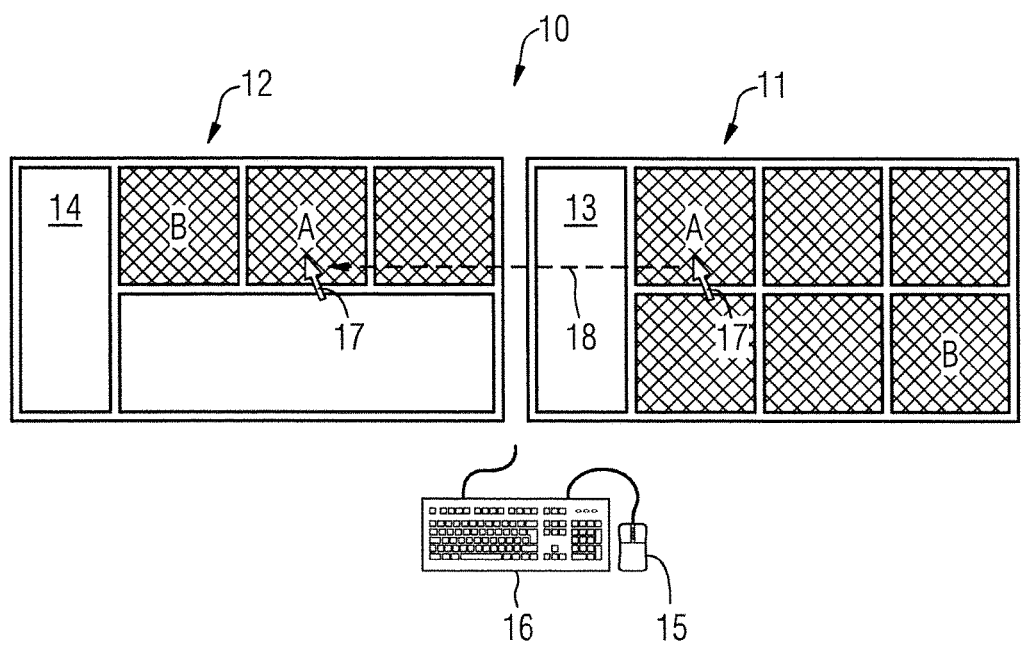
FIG. 1 shows an exemplary arrangement of a first computer system and a second computer system according to the prior art.

FIG. 1 shows an exemplary arrangement 10 with a first computer system 11 and a second computer system 12, as known from the prior art. The two computer systems have graphical interfaces 13, 14 respectively, which have a plurality of objects A, B, etc. The objects A, B, etc. can be selected on the graphical interfaces 13, 14 and moved with a drag and drop operation. For this purpose, the arrangement 10 has common control elements 15, 16, which are implemented in this case as a mouse 15 and a keyboard 16. An object that is to be moved from the first computer system 11 onto the second computer system 12 can be selected with the mouse 15. This gives rise to the technical problem that a mouse cursor 17 leaves the first computer system 11 and subsequently reappears at a point on the user interface of the second computer system 12 and in the process the previously selected data reference is still to be retained.

Furthermore, the path 18 of the mouse cursor 17 is not efficient during this drag and drop operation. This applies particularly whenever a user selects a distant object, such as object B in FIG. 1. To move or displace the object B from the first computer system 11 to the second computer system 12, a long distance 18 is traveled by the mouse, which takes a corresponding amount of time, and also a corresponding space should be available for the movement of the mouse 15.

Figure 2:
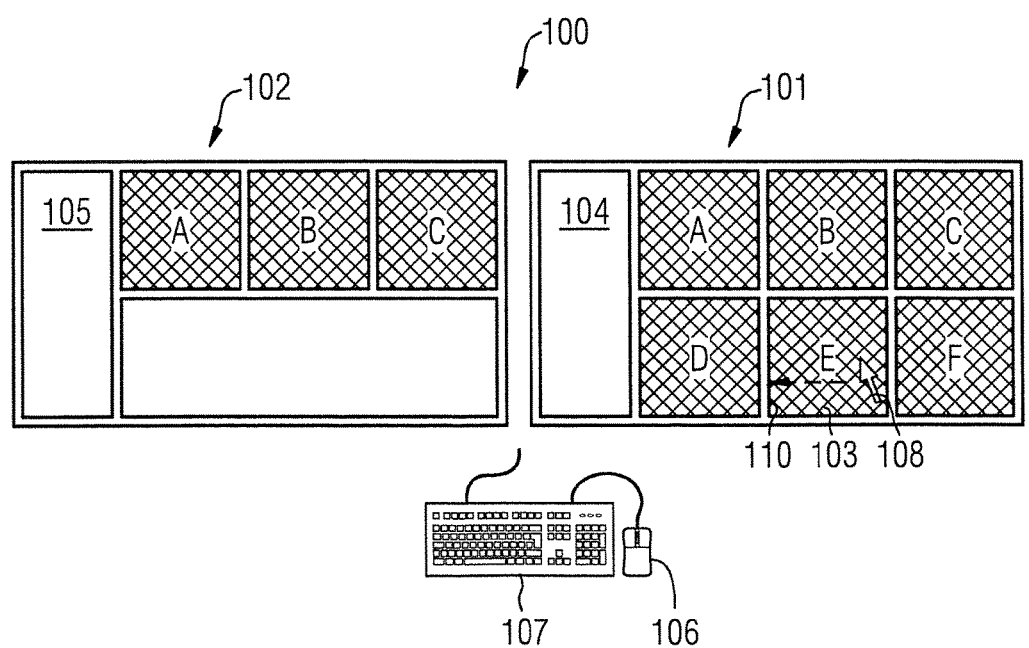
FIG. 2 shows an exemplary embodiment of a computer system for displacement of an object within the computer system according to the invention.
Figure 3:
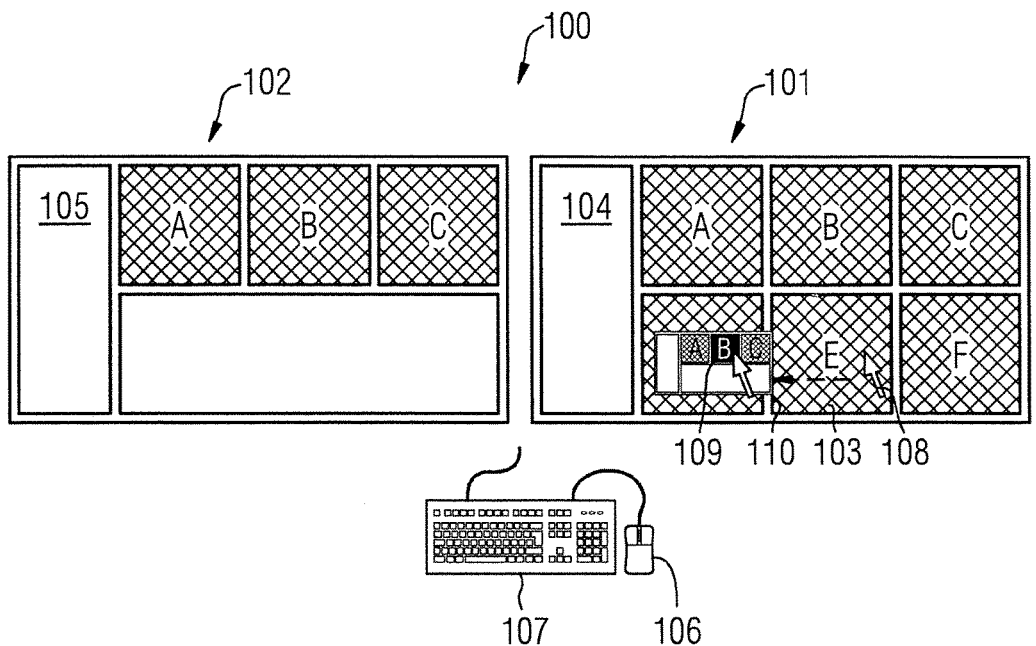
FIG. 3 shows the exemplary embodiment of FIG. 2 with a miniature view.
Figure 4:
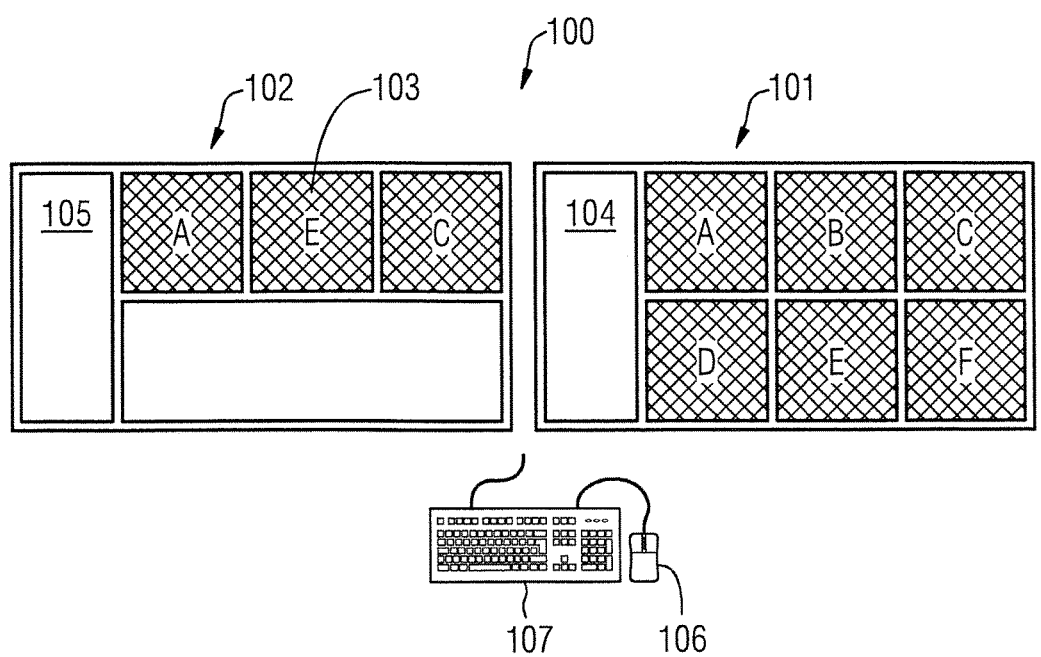
FIG. 4 shows the exemplary embodiment of FIG. 2 following the displacement of an object.

The schematic representations in FIGS. 2 to 4 show an exemplary embodiment of a computer network 100 with a first computer system 101 and a second computer system 102. FIGS. 2 to 4 show various times during the displacement of an object 103, in this case object E, from the first computer system 101 to the second computer system 102. For this purpose, the two computer systems 101, 102 each have a graphical user interface 104, 105 on which the graphical objects A, B, C, etc. are mapped. Furthermore, the computer network 100 has common control elements 106, 107, which are realized in this case as a mouse 106 and a keyboard 107.

In FIG. 2, the object 103 on the first graphical user interface 104 is selected with the mouse 107. This consists of an object 103 which has an interactive region and which presents image sequences from a medical apparatus that incorporates the first computer system 101. As soon as the mouse cursor 108 reaches or crosses a region boundary 110 of the object 103, a selection view 109, in this case a dialog window 109, is displayed with a miniature view of the second computer system 102, or more accurately the second graphical user interface 105. In this regard, the mouse cursor is only moved a short distance in order to get to the region boundary 110. This situation, with respect to a selection facility upon reaching the region boundary, is shown in FIG. 3.

In FIG. 3, the miniature view of the second graphical user interface 105 is shown in the dialog window 109, only one second computer system 102 being present within the computer network 100 in this example. If further computer systems are installed in the computer network 100, for example in an Internet network or a computer network that is linked via a bus system, then a selection facility can initially be displayed in the dialog window 109 in order to select one or multiple computer systems in order to displace the object 103 to the same.

FIG. 3 indicates furthermore that a user, with the mouse button pressed down, for example the left mouse button, can then select a target region or a target location on the second graphical user interface 105 of the second computer system 102. This takes place as the selected object 103 is moved, with the mouse button still pressed down, to the desired target in the miniature view. In other words, the mouse cursor can be moved over the miniature view in the dialog window. Targets that support a drop to conclude the drag and drop operation on the selected object 103 are displayed in the miniature view. This means that a selection view can be made available individually for each selected object A, B, C, etc. so that only those movements of the objects are supported that are compatible with the operation of the technical apparatus which, for example, incorporates one of the computer systems or multiple computer systems.

Possible target locations are visualized for the user by a mouse-overlay effect or a mouse-over effect respectively, for example. Thus, in FIG. 3, the arrangement of the objects A, B, C on the second graphical user interface 105 is represented as a miniature view, so that the user moves a very short distance with the mouse cursor within the miniature view in order to select the target location for the object 103. It is also possible for the dialog window containing the miniature view of the other computer system in each case to be opened, for example, by a right-click of the mouse or a voice command or similar.

This exemplary embodiment provides that the dialog window 109 containing the miniature view closes as soon as the user releases the mouse button, in this case the left mouse button. FIG. 4 represents the situation where, following the release of the mouse button, in this case the left mouse button, the selected object 103 has been displaced to the selected location B on the second computer system 102, without the mouse cursor 108 having to leave the boundaries of the first graphical user interface 104 or the UI boundaries of the first computer system 101, which is in an active state, in the process. The selected object 103 on the first graphical user interface 104 has been displaced to the target location or copied to there, with the target location having been displayed previously in the miniature view on the first graphical user interface 104. The object does not necessarily "only" have to be displaced, therefore; instead it can also be copied to there in accordance with an alternative AFF. Nor does the mouse cursor necessarily have to be displaced; the object can also just appear at the target location and the mouse cursor can, for example, stay where it is.

For the purpose of the described interaction, a database with common access belonging to the computer systems 101, 102 and also a common interface for exchange of the miniature views and the selected objects 103 can be used. In the case of a common database, on a server in the computer network for example, it is not necessary for both computer systems 101, 102 to be activated simultaneously. It is sufficient if the computer system with the graphical interface on which a selection of an object 103 is to be made is active. In such a case, the contents of the dialog window or the miniature view respectively can be presented by the server which, for example, stored the last state of the graphical user interface of the other computer system prior to that computer system being powered down or switched to a standby mode.

Figure 5:
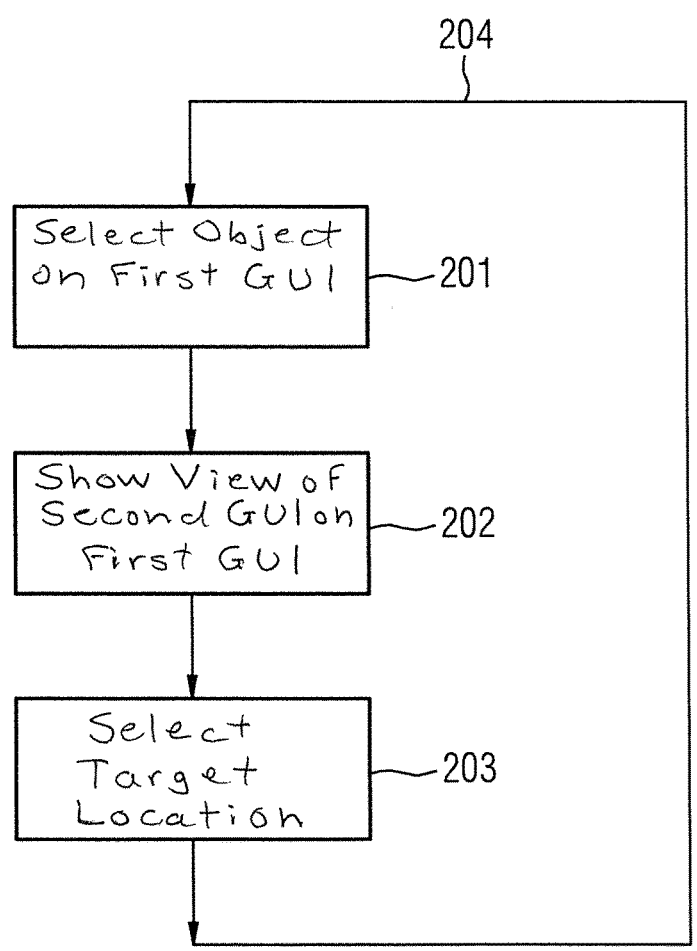
FIG. 5 is a flowchart of an exemplary embodiment of the method according to the invention.

FIG. 5 is a flowchart of an exemplary embodiment of the method according to the invention, as can be implemented with the computer network 100 in FIGS. 2 to 4. In FIG. 5, box 201 indicates selection of the object 103 on the first graphical user interface (GUI) 101. Box 202 indicates presentation of a selection view 109 of the second graphical user interface (GUI) 105 on the first user interface 104. In box 203, furthermore, a selection of a target location in the selection view 109 is provided, in order to displace the selected object 103 from the first graphical user interface 104 to the target location on the second graphical user interface 105. In this regard, the method can be carried out both on the first computer system 101 and also on the second computer system 102. Further features can also be provided within the method in order to correspond to the features of the computer network according to the invention. The method can also be carried out as often as desired for multiple objects successively over time or in parallel over time, as indicated by the operation loop 204.

To those skilled in the art, it is evident that the invention can be implemented partly or wholly in software and/or hardware and/or among multiple of physical components, computer program products in particular, as a distributed arrangement.

Although modifications and changes may be suggested by those skilled in the art, it is the intention of the inventor to embody within the patent warranted hereon all changes and modifications as reasonably and properly come within the scope of his contribution to the art.

We claim as our invention:

1. A computer network comprising:
   a first computer comprising a first graphical user interface, said first computer being configured to allow selection of an object at said first graphical user interface by movement of a cursor onto the object at the first graphical user interface;
   a second computer comprising a second graphical user interface, said second computer being in communication with said first computer;
   said first and second computers being jointly configured to generate and receive electronic signals in order to exchange said electronic signals between said first and second computers to cause a selection view, which is a miniature view of said second graphical user interface, to be automatically presented within said object on said first graphical user interface in response to said cursor being moved onto the object at the first graphical user interface;
   said first computer being configured to allow a target location to be selected in the selection view by a drag and drop movement of the cursor at the first graphical user interface from the object to the target location in the selected view presented at said first graphical user interface; and
   said first and second computers being jointly configured to generate and receive further electronic signals in order to exchange said further electronic signals to cause said object to be moved from said first graphical user interface to a location on said second graphical user interface that is the same as said target location that was selected in the selection view at the first graphical interface, upon entry of an input made via said first computer.

2. The computer network as claimed in claim 1 wherein said selection view is a miniature view of said second graphical user interface.

3. The computer network as claimed in claim 1 wherein said first computer system is a component of a medical apparatus and said selected object is an acquired image, or a sequence of images, acquired with said medical apparatus.

4. The computer network as claimed in claim 1 comprising a common control element for said two computer systems.

5. The computer network as claimed in claim 1 wherein said first graphical user interface comprises at least one interactive region that causes said object to be selected when traversed by said cursor.

6. The computer network as claimed in claim 5 wherein said interactive region has a boundary region of said object.

7. A method for displacing an object from a first graphical user interface of a first computer onto a second graphical user interface of a second computer, said method comprising:
   at a first computer comprising a first graphical user interface, selecting an object at said first graphical user interface by moving a cursor onto the object at the first graphical user interface;
   placing said first computer in communication with a second computer comprising a second graphical user interface;
   generate and receive electronic signals in order to exchange said electronic signals between said first and second computers to cause a selection view, which is a miniature view of said second graphical user interface, to be automatically presented within said object on said first graphical user interface in response to said cursor being moved onto the object at the first graphical user interface;

selecting a target location in the selection view by moving the cursor at the first graphical user interface in a drag and drop movement from the object to the target location in the selected view presented at said first graphical user interface; and generate and receive further electronic signals in order to exchange said further electronic signals to cause said object to be moved from said first graphical user interface to said target location on said second graphical user interface that is the same as said target location that was selected in the selection view at the first graphical interface upon entry of an input made via said first computer.

8. A non-transitory, computer-readable data storage medium encoded with programming instructions, said storage medium being distributively loaded into a first computer, having a first graphical user interface, and into a second computer, having a second graphical user interface, said first and second computers being in communication with each other, and the distributed programming instructions causing said first and second computers to:

allow selection of an object at said first graphical user interface by movement of a cursor onto the object at the first graphical user interface;

generate and receive electronic signals in order to exchange said electronic signals between said first and second computers to cause a selection view, which is a miniature view of said second graphical user interface, to be automatically presented within said object on said first graphical user interface in response to said cursor being moved onto the object at the first graphical user interface;

allow a target location to be selected in the selection view by moving the cursor at the first graphical user interface in a drag and drop movement from the object to the target location in the selected view presented at said first graphical user interface; and generate and receive further electronic signals in order to exchange said further electronic signals to cause said object to be moved from said first graphical user interface to said target location on said second graphical user interface that is the same as said target location that was selected in the selection view at the first graphical interface upon entry of an input made via said first computer.

* * * * *